Patented Aug. 12, 1952

2,606,904

UNITED STATES PATENT OFFICE 2,606,904

PREPARATION OF GUANAMINES

Donald W. Kaiser, Old Greenwich, Conn., assignor to American Cyanamid Company, New York, N. Y., a corporation of Maine No Drawing. Application December 9, 1950, Serial No. 200,106

10 Claims. (Cl. 260—249.9)

The present invention relates to the preparation of guanamines and more particularly to an improved method of preparing the higher alkyl and alkenyl guanamines, such as stearoguanamine, lauroguanamine, and the like.

It is old in the art to prepare guanamines by heating together dicyandiamide and a nitrile in a hydroxylated solvent in the presence of a highly basic catalyst. In the said prior art process all of the nitrile was reacted at once with all of the dicyandiamide, resulting in most cases in a superior yield of guanamine. With certain higher fatty acid nitriles (those containing at least eight carbon atoms), however, this method gave rather inferior yields of guanamines; for example, 51.5% is typical for stearoguanamine. The present invention discloses a method for increasing this yield substantially when using the said higher fatty acid nitriles.

It has now been found that if dicyandiamide is added portionwise to the higher fatty acid nitrile dissolved in a hydroxylated solvent, the yield of guanamine is considerably increased. The basic catalyst can be dissolved in the hydroxylated solvent along with the nitrile, but is preferably added portionwise along with the dicyandiamide.

Various methods are available for the portionwise addition of dicyandiamide. According to one optional procedure it is added through a solids addition tube, care being taken to avoid clogging of the tube by the condensing solvent vapors. In an alternate method a solution of dicyandiamide in the solvent (which solution preferably but not necessarily also carries the catalyist) is added slowly to the dissolved nitrile. In a third method the condensing solvent vapors are allowed slowly to extract dicyandiamide from a mass of the same exposed to the returning solvent.

The period of time over which the dicyandiamide is added is important and should be at least one hour.

The following examples illustrate without limiting the invention.

Example 1

A 2 liter, 3-necked flask, surrounded by an oil bath, was equipped with a thermometer, stirrer, and a Y tube. Into one arm of the Y tube was placed a 15 inch long asbestos insulated, glass tube 20 mm. in diameter. An 8-mm., goosenecked curved piece of glass tubing, provided with one ground glass joint, was placed in the upper end of the large upright tube. The downward portion of the 8-mm. tube, which was parallel to the larger tube, was surrounded by a small condenser and the terminal end of the tube projected several inches into the open mouth of an addition funnel which had been inserted in the other arm of the Y tube.

After placing 6.6 g. (0.10 mol) of 85% potassium hydroxide pellets and 260 cc. of ethyl Cellosolve (glycol monoethyl ether) in the flask, the mixture was stirred and gently warmed until complete solution resulted. In the meantime a small piece of glass wool was placed in the bottom of the addition funnel, followed by 101 g. (1.2 mols) of dicyandiamide, and 100 cc. of ethyl Cellosolve. The stopcock was kept closed. When solution of the alkali occurred, 270 g. (1.0 mol) of molten 98% stearonitrile was poured into the reaction flask and the solution heated. The ethyl Cellosolve vapors climbed up the wide bore tube, passed through the gooseneck, were condensed, and flowed into the addition funnel at an oil bath temperature of 190°–200° C. and an internal temperature of 145°–150° C. As soon as a steady flow resulted, the stopcock in the addition funnel was opened and the flow of the saturated dicyandiamide solution was regulated so that the crystals were always covered by liquid. During the following reaction, some solid separated on the walls of the flask and ammonia was involved, but the solution remained clear for about 2½ hours before solids began to precipitate. All of the dicyandiamide was added in 3 hours in this manner and heating was continued one half hour longer. The oil bath was temporarily removed, 6 g. (0.10 mol) of glacial acetic acid was added for the purpose of neutralizing the catalyst, the addition apparatus dismantled, and the ethyl Cellosolve removed under reduced pressure. A receiver was surrounded by ice water and a maximum oil bath temperature of 200° C. was used to remove all the solvent. The hot melt was poured into a flask, giving 370 g. of a tan colored material which melted to an opaque liquid at about 100°–105° C. The reaction flask still contained some product which was rinsed out with isopropanol. The crude material was then dissolved in a small volume of isopropanol, the solution treated with decolorizing charcoal and filter aid, filtered through a preheated funnel, and the light yellow filtrate cooled in an ice bath. After filtering and washing with a small quantity of cold isopropanol, the nearly colorless solid was air dried. The yield of stearoguanamine was 288 g. or 83% of the theoretical.

Example 2

Using the procedure of Example 1, 1 mol of stearonitrile was reacted with 1.2 mols of dicyandiamide, using 0.1 mol of potassium hydroxide pellets as a catalyst and 400 cc. of butanol as the solvent. Because of the poor solvent action of butanol, 6½ hours was required to add the dicyandiamide. The solution refluxed at 125° C. instead of the usual 145°–150° C., and the yield of purified stearoguanamine was 73%.

*Example 3*

The instant example illustrates the portionwise addition of dicyandiamide to the nitrile, the dicyandiamide being added as the solid rather than as a solution as in the preceding examples.

A mixture of 135 g. of stearonitrile (0.5 mol), 200 cc. of ethyl Cellosolve, 21 g. of dicyandiamide, and 6 g. of potassium dicyandiamide catalyst was stirred and heated to reflux (145° C.). A clear solution initially formed but solids soon precipitated. After every hour for 3 hours, 21 g. of dicyandiamide and 2 g. of potassium dicyandiamide were added to the slurry. Heating was continued for a total of 5 hours, until a total of 84 g. of dicyandiamide had been reacted. The insolubles were then filtered and washed with hot ethyl Cellosolve. The filtrate was poured into water, the precipitated product was filtered, washed with water, and dried in an oven. The yield of crude stearoguanamine (M. P. 109°–114° C.) was 100% of theoretical. Crystallization from isopropanol gave a purified yield of 77.5% of stearoguanamine melting at 115°–118° C.

In a run identical to the preceding example, except that the materials were reacted all at once, the yield of purified stearoguanamine was only 51.5% and the melting point was only 108°–112° C.

The strongly basic materials that may be used as catalysts in the present invention include the alkali metal alkoxides, the alkali metal hydroxides, the dibasic alkali metal cyanamides, the alkali metal dicyandiamides, the alkali metal anilides, and the like. The catalysts are generally employed in an amount equal to substantially 1/20 to 1/10 mol per mol of nitrile. Various solvents are suitable, including the Cellosolve (glycol mono ethers), glycols, alcohols, and the like.

Instead of stearonitrile, any of the other higher fatty acid nitriles containing at least eight carbon atoms can be used in the same way as the above examples with improved guanamine yields. Such nitriles are lauronitrile, oleonitrile, palmitonitrile, myristonitrile, and the like. The nitriles can be saturated or unsaturated, and if desired can be mixed with each other.

While the invention has been described with particular reference to specific embodiments, it is to be understood that it is not to be limited thereto but is to be construed broadly and restricted solely by the scope of the appended claims.

I claim:

1. In the method of preparing a guanamine by reacting a higher fatty acid nitrile of the group consisting of alkyl and alkenyl nitriles containing at least eight carbon atoms with dicyandiamide in a hydroxylated inert solvent in the presence of a highly basic catalyst the improvement that comprises adding the dicyandiamide to the dissolved nitrile over a period of time of at least one hour.

2. The method according to claim 1 in which the dicyandiamide is added as a solid.

3. The method according to claim 2 in which most of the catalyst is added with the dicyandiamide.

4. The method according to claim 1 in which the dicyandiamide is added continuously to the reaction mass, the dicyandiamide being dissolved in an inert solvent.

5. The method according to claim 4 in which most of the catalyst is added along with the dissolved dicyandiamide.

6. The method according to claim 1 in which the nitrile is stearonitrile.

7. The method according to claim 1 in which the nitrile is lauronitrile.

8. The method according to claim 1 in which the nitrile is palmitonitrile.

9. The method according to claim 1 in which the nitrile is oleonitrile.

10. The method according to claim 1 in which the nitrile is myristonitrile.

DONALD W. KAISER.

REFERENCES CITED

The following references are of record in the file of this patent:

UNITED STATES PATENTS

| Number | Name | Date |
|---|---|---|
| 2,302,162 | Zerwedi | Nov. 17, 1942 |
| 2,491,658 | Gresham | Dec. 20, 1949 |
| 2,510,761 | Simons | June 6, 1950 |
| 2,532,519 | Simons | Dec. 5, 1950 |